United States Patent
Kurtzberg et al.

(10) Patent No.: US 6,922,706 B1
(45) Date of Patent: Jul. 26, 2005

(54) DATA MINING TECHNIQUES FOR ENHANCING SHELF-SPACE MANAGEMENT

(75) Inventors: Jerome M. Kurtzberg, Yorktown Heights, NY (US); Menachem Levanoni, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/559,379

(22) Filed: Apr. 27, 2000

(51) Int. Cl.[7] .............................................. G06F 17/30
(52) U.S. Cl. ............................ 707/200; 707/5; 707/6; 707/100; 705/10; 705/22; 705/28
(58) Field of Search ....................... 707/1.1, 3–4, 2, 707/5, 6, 100, 200; 705/10, 22, 28, 35–38; 706/50–54, 61

(56) References Cited

U.S. PATENT DOCUMENTS

| | | | | |
|---|---|---|---|---|
| 4,947,322 A | * | 8/1990 | Tenma et al. .................. | 705/28 |
| 5,212,765 A | * | 5/1993 | Skeirik .......................... | 706/23 |
| 5,224,203 A | * | 6/1993 | Skeirik .......................... | 706/23 |
| 5,241,467 A | * | 8/1993 | Failing et al. ................. | 705/22 |
| 5,282,261 A | * | 1/1994 | Skeirik .......................... | 706/23 |
| 5,307,260 A | * | 4/1994 | Watanabe et al. ............... | 703/2 |
| 5,313,392 A | * | 5/1994 | Temma et al. .................. | 705/27 |
| 5,408,586 A | * | 4/1995 | Skeirik .......................... | 706/25 |
| 5,640,493 A | * | 6/1997 | Skeirik .......................... | 706/25 |
| 5,680,305 A | * | 10/1997 | Apgar, IV .................... | 705/10 |
| 5,712,989 A | * | 1/1998 | Johnson et al. ............... | 705/28 |
| 5,748,188 A | * | 5/1998 | Hu et al. ....................... | 705/22 |
| 5,774,868 A | * | 6/1998 | Cragun et al. ................. | 705/10 |
| 5,826,249 A | * | 10/1998 | Skeirik .......................... | 706/25 |
| 5,832,496 A | * | 11/1998 | Anand et al. ................ | 707/102 |
| 5,893,076 A | * | 4/1999 | Hafner et al. .................. | 705/28 |
| 5,966,704 A | * | 10/1999 | Furegati et al. ................. | 707/3 |
| 5,970,476 A | * | 10/1999 | Fahey .......................... | 705/28 |
| 6,078,922 A | * | 6/2000 | Johnson et al. ............. | 707/100 |

FOREIGN PATENT DOCUMENTS

WO     WO-0043934     *   7/2000

* cited by examiner

*Primary Examiner*—Shahid Alam
(74) *Attorney, Agent, or Firm*—Stephen C. Kaufman, Esq.; McGinn & Gibb, PLLC

(57) ABSTRACT

A computer method for enhancing shelf-space management. The method includes the steps of providing a shelf-space-requirements database comprising a compendium of individual shelf-space-requirements history; providing a shelf-space-availability database comprising a compendium of at least one of shelf-space management solutions, shelf-space information, and shelf-space diagnostics; and, employing a data mining technique for interrogating the shelf-space-requirements and shelf-space-availability databases for generating an output data stream, the output data stream correlating shelf-space-requirements problem with shelf-space-availability solution.

15 Claims, 4 Drawing Sheets

DATA MINING TECHNIQUES FOR ENHANCING SHELF-SPACE MANAGEMENT

CROSS REFERENCE TO RELATED APPLICATIONS

This application is related to application Ser. No. 09/604,535 to Levanoni, et al. filed Jun. 27, 2000; to application Ser. No. 09/612,683 to Levanoni, et al. filed Jul. 10, 2000; to application Ser. No. 09/633,830 to Levanoni, et al. filed Aug. 7, 2000; and to application Ser. No. 09/696,552 to Levanoni, et al. filed Oct. 25, 2000. Each of these applications is co-pending and commonly assigned.

BACKGROUND OF THE INVENTION

1. Field of the Invention

This invention relates to methodology for utilizing data mining techniques in the area of shelf-space management.

2. Introduction to the Invention

Data mining techniques are known and include disparate technologies, like neural networks, which can work to an end of efficiently discovering valuable, non-obvious information from a large collection of data. The data, in turn, may arise in fields ranging from e.g., marketing, finance, manufacturing, or retail.

SUMMARY OF THE INVENTION

We have now discovered novel methodology for exploiting the advantages inherent generally in data mining technologies, in the particular field of shelf-space management applications.

Our work proceeds in the following way.

We have recognized that a typical and important "three-part" paradigm for presently effecting shelf-space management, is a largely subjective, human paradigm, and therefore exposed to all the vagaries and deficiencies otherwise attendant on human procedures. In particular, the three-part paradigm we have in mind works in the following way. First, a shelf-space manager develops a shelf-space database comprising a compendium of individual shelf-space-requirements—e.g., specific shelf-space-requirements which took place in its past. Secondly, and independently, the shelf-space manager develops in his mind a shelving availability database comprising the shelf-space manager's personal, partial, and subjective knowledge of (otherwise objective) retail facts culled from e.g., the marketing literature, the business literature, or input from colleagues or salespersons. Thirdly, the shelf-space manager subjectively correlates in his mind the necessarily incomplete and partial shelving-availability database, with the shelf-space-requirements' database, in order to promulgate an individual's shelf-space-requirements prescribed shelf-space management and ultimate solution.

This three-part paradigm is part science and part art, and captures one aspect of the problems associated with shelf-space management. However, as suggested above, it is manifestly a subjective paradigm, and therefore open to human vagaries.

We now disclose a novel computer method which can preserve the advantages inherent in this three-part paradigm, while minimizing the incompleteness and attendant subjectivities that otherwise inure in a technique heretofore entirely reserved for human realization.

To this end, in a first aspect of the present invention, we disclose a novel computer method comprising the steps of:

i) providing a shelf-space-requirements database comprising a compendium of shelf-space-requirements history;

ii) providing a shelf-space-availability database comprising a compendium of at least one of shelf-space management solutions, shelf-space information, and shelf-space diagnostics; and iii) employing a data mining technique for interrogating said shelf-space-requirements and shelf-space-availability databases for generating an output data stream, said output data stream correlating requirements problem with availability solution.

The novel method preferably comprises a further step of updating the step i) shelf-space-requirements database, so that it can cumulatively track the shelf-space-requirements history as it develops over time. For example, this step i) of updating the shelf-space-requirements database may include the results of employing the step iii) data mining technique. Also, the method may comprise a step of refining an employed data mining technique in cognizance of pattern changes embedded in each database as a consequence of shelf-space-solutions results and updating the shelf-space-requirements database.

The novel method preferably comprises a further step of updating the step ii) shelf-space-availability database, so that it can cumulatively track an ever increasing and developing technical shelf-space management literature. For example, this step ii) of updating the shelf-space-availability database may include the effects of employing a data mining technique on the shelf-space-requirements database. Also, the method may comprise a step of refining an employed data mining technique in cognizance of pattern changes embedded in each database as a consequence of shelf-space-solutions results and updating the shelf-space-solutions database.

The novel method may employ advantageously a wide array of step iii) data mining techniques for interrogating the shelf-space-requirementss and shelf-space-solutions database for generating an output data stream, which output data stream correlates shelf-space-requirementss problem with shelf-space availabilty solution. For example, the data mining technique may comprise inter alia employment of the following functions for producing output data: classification-neural, classification-tree, clustering-geoographic, clustering-factor analysis, or principal component analysis, or expert systems.

In a second aspect of the present invention, we disclose a program storage device readable by machine to perform method steps for providing an interactive shelf-space management database, the method comprising the steps of:

i) providing a shelf-space-requirements database comprising a compendium of shelf-space-requirements history;

ii) providing a shelf-space-availability database comprising a compendium of at least one of shelf-space management solutions, shelf-space information, and shelf-space diagnostics; and iii) employing a data mining technique for interrogating said shelf-space-requirements and shelf-space-availability databases for generating an output data stream, said output data stream correlating requirements problem with availability solution.

In a third aspect of the present invention, we disclose a computer comprising:

i) means for inputting a shelf-space-requirements database comprising a compendium of individual shelf-space-requirements history;

ii) means for inputting a shelf-space-availability database comprising a compendium of at least one of shelf-space management solutions, shelf-space information, and shelf-space diagnostics;

iii) means for employing a data mining technique for interrogating said shelf-space-availability databases; and iv) means for generating an output data stream, said output data stream correlating shelf-space-requirements problem with shelf-space-availability solution.

We have now summarized the invention in several of its aspects or manifestations. It may be observed, in sharp contrast with the prior art discussed above comprising the three part subjective paradigm approach to the problem of shelf-space management, that the summarized invention utilizes inter alia, the technique of data mining. We now point out, firstly, that the technique of data mining is of such complexity and utility, that as a technique, in and of itself, it cannot be used in any way as an available candidate solution for shelf-space management, to the extent that the problem of shelf-space management is only approached within the realm of the human-subjective solution to shelf-space management. Moreover, to the extent that the present invention uses computer techniques including e.g., data mining techniques, to an end of solving a problem of shelf-space management, it is not in general obvious within the nominal context of the problem and the technique of data mining, how they are in fact to be brought into relationship in order to provide a pragmatic solution to the problem of shelf-space management. It is rather an aspect of the novelty and unobviousness of the present invention that it discloses, on the one hand, the possibility for using the technique of data mining within the context of shelf-space management, and, moreover, on the other hand, discloses illustrative methodology that is required to in fact pragmatically bring the technique of data mining to bear on the actuality of solving the problem of shelf-space management.

BRIEF DESCRIPTION OF THE DRAWING

The invention is illustrated in the accompanying drawing, in which.

DETAILED DESCRIPTION OF THE PRESENT INVENTION

The detailed description of the present invention proceeds by tracing through three quintessential method steps, summarized above, that fairly capture the invention in all its sundry aspects. To this end, attention is directed to the flowcharts and neural networks of FIGS. 1 through 4, which can provide enablement of the three method steps.

Figure 1:
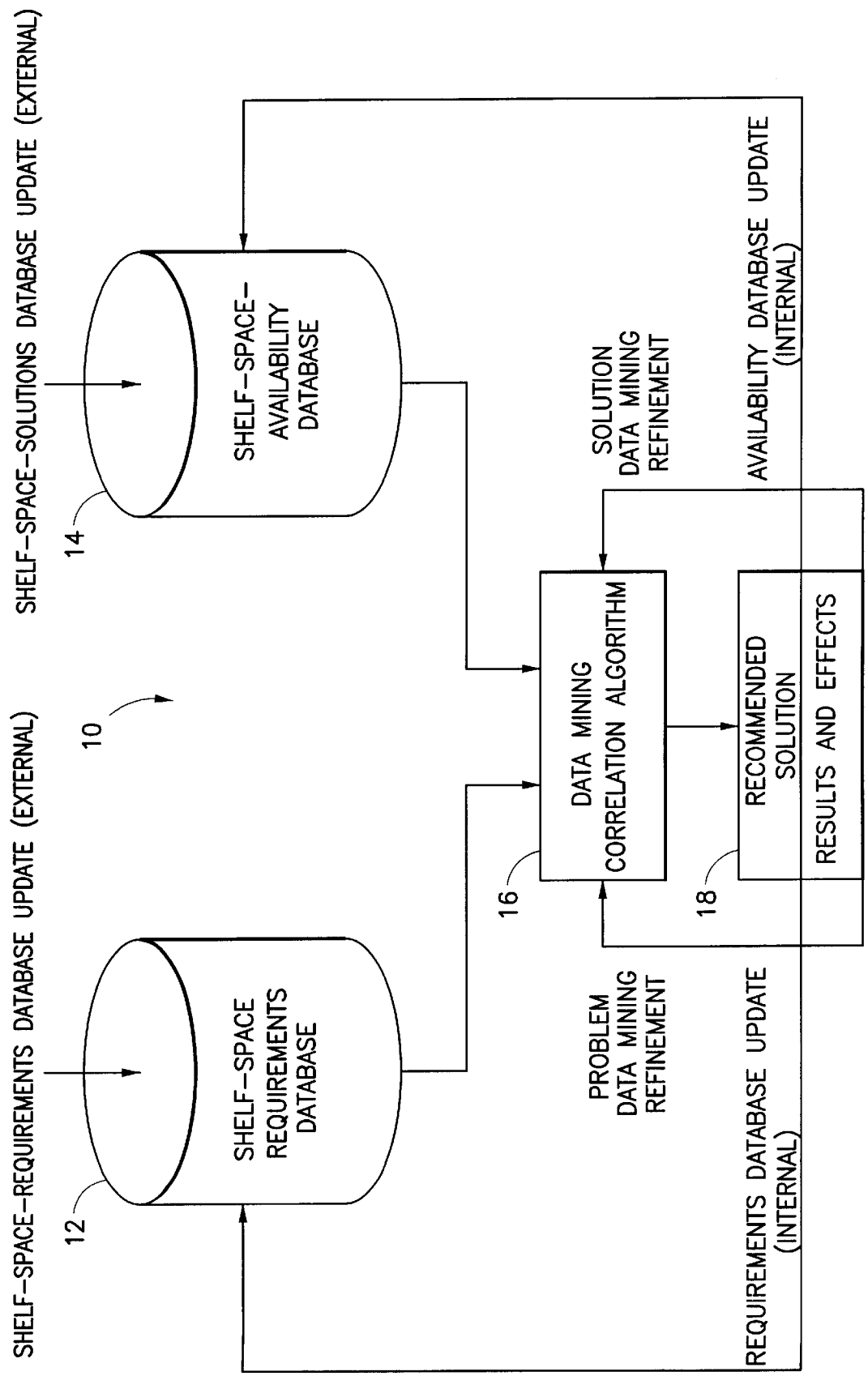
FIG. 1 provides an illustrative flowchart comprehending overall realization of the method of the present invention.

FIG. 1, numerals 10–18, illustratively captures the overall spirit of the present invention. In particular, the FIG. 1 flowchart (10) shows a shelf-space-requirements database (12) comprising a compendium of individual shelf-space-requirements history, and a shelf-space-availability database (14) comprising a compendium of at least one of shelf-space management solutions, shelf-space information, and shelf-space diagnostics. Those skilled in the art will have no difficulty, having regard to their own knowledge and this disclosure, in creating or updating the databases (12,14) e.g., conventional techniques can be used to this end. FIG. 1 also shows the outputs of the shelf-space-requirements database (12) and shelf-space-availability database (14) input to a data mining correlation algorithm box (16). The data mining algorithm can interrogate the information captured and/or updated in the shelf-space-requirements and databases (12, 14), and can generate an output data stream (18) correlating shelf-space-requirements problem with shelf-space-availability solution. Note that the output (18) of the data mining algorithm can be most advantageously, self-reflexively, fed as a subsequent input to at least one of the shelf-space-requirements database (12), the shelf-space-availability database (14), and the data mining correlation algorithm (16).

Figure 2:
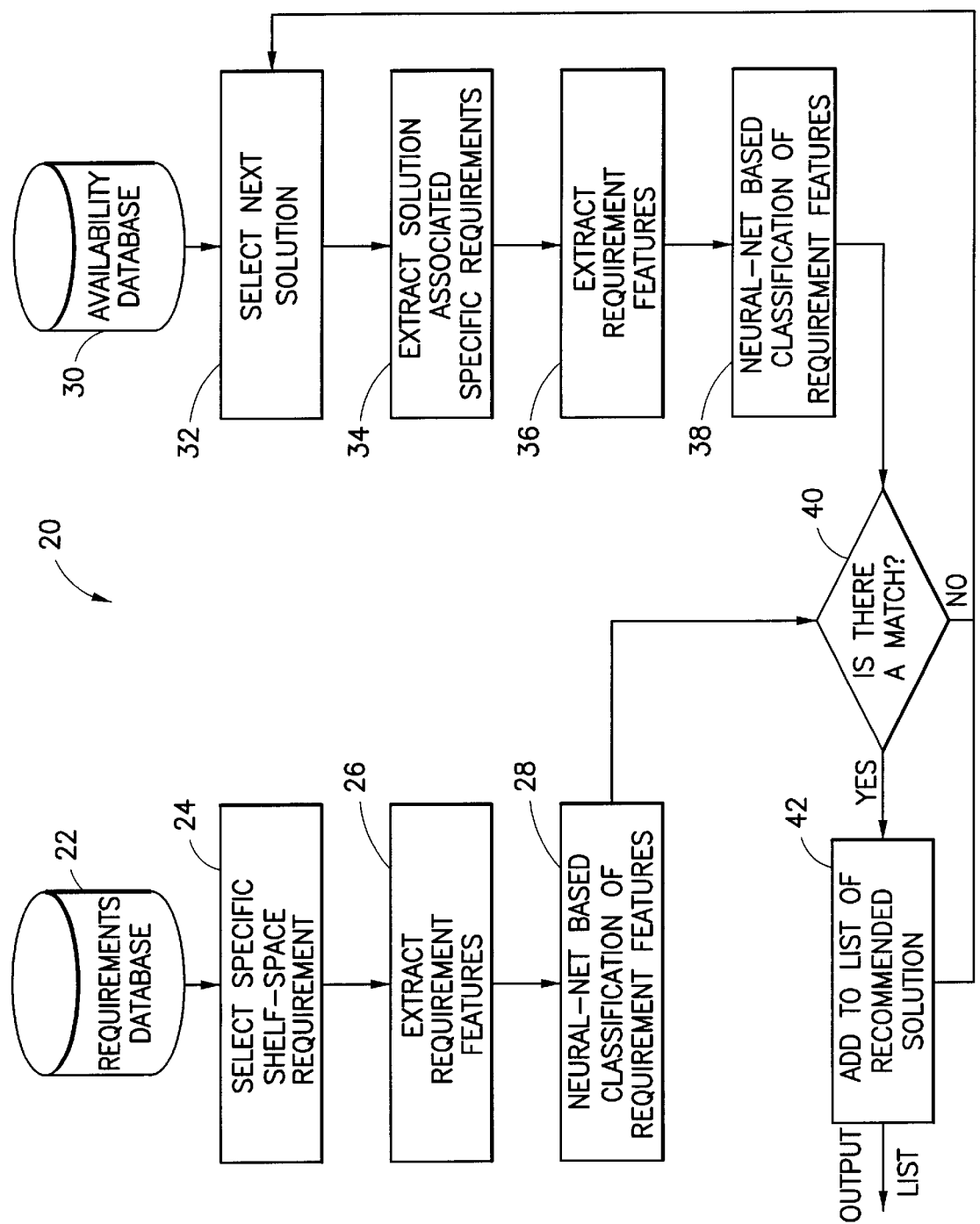
FIG. 2 provides an illustrative flowchart of details comprehended in the FIG. 1 flowchart.

Attention is now directed to FIG. 2, which provides a flowchart (20–42) that recapitulates some of the FIG. 1 flowchart information, but adds particulars on the immediate correlation functionalities required of a data mining correlation algorithm. For illustrative purposes, FIG. 2 comprehends the data mining correlation algorithm as a neural-net based classification of shelf-space-requirements features, e.g., wherein a shelf-space-requirements feature for say, canned beans, may include can style, size, color, current local inventory, expected shelf-space-requirements by week, etc.

Figure 3:
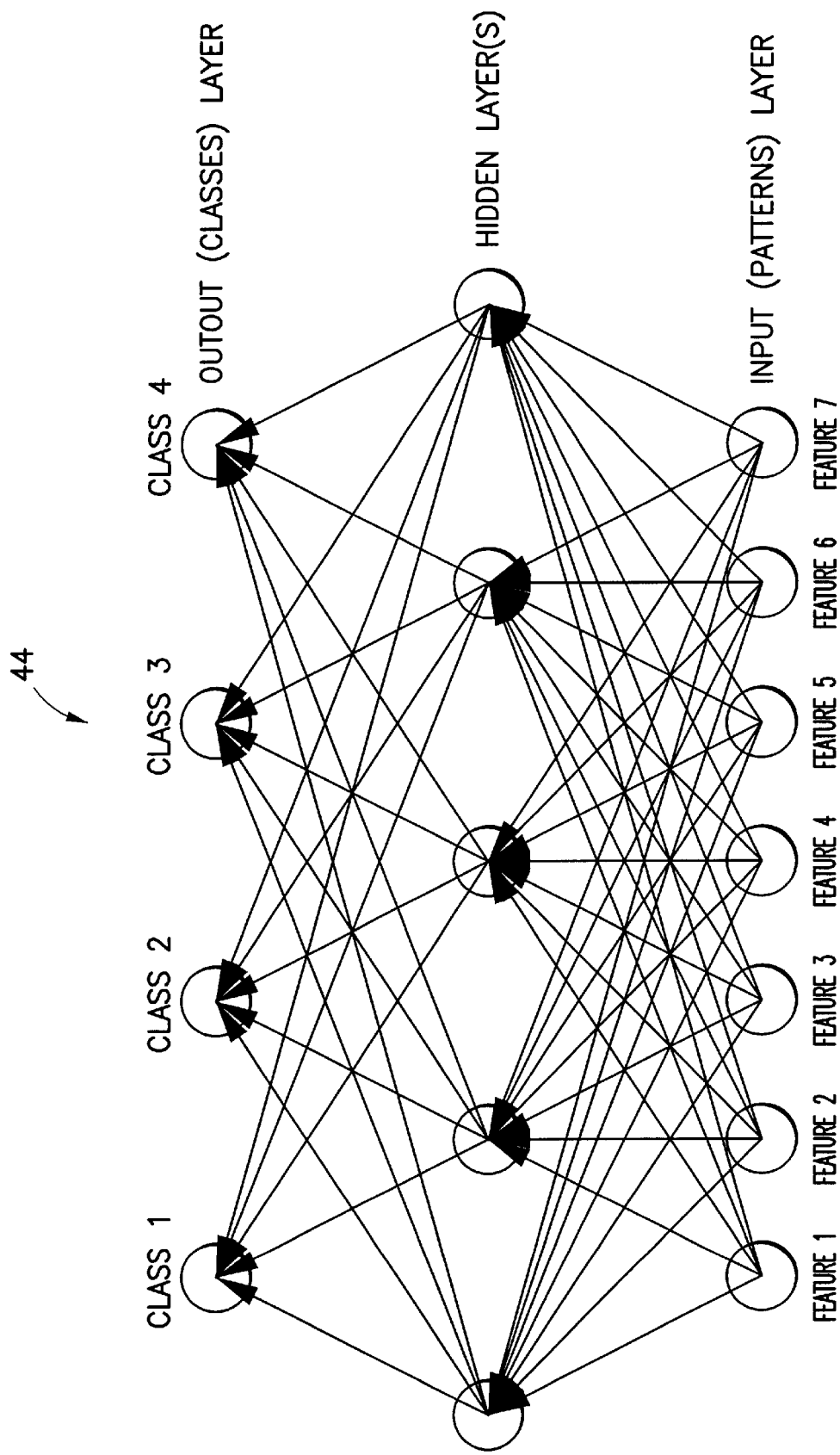
FIG. 3 shows a neural network that may be used in realization of the FIGS. 1 and 2 data mining algorithm.
Figure 4:
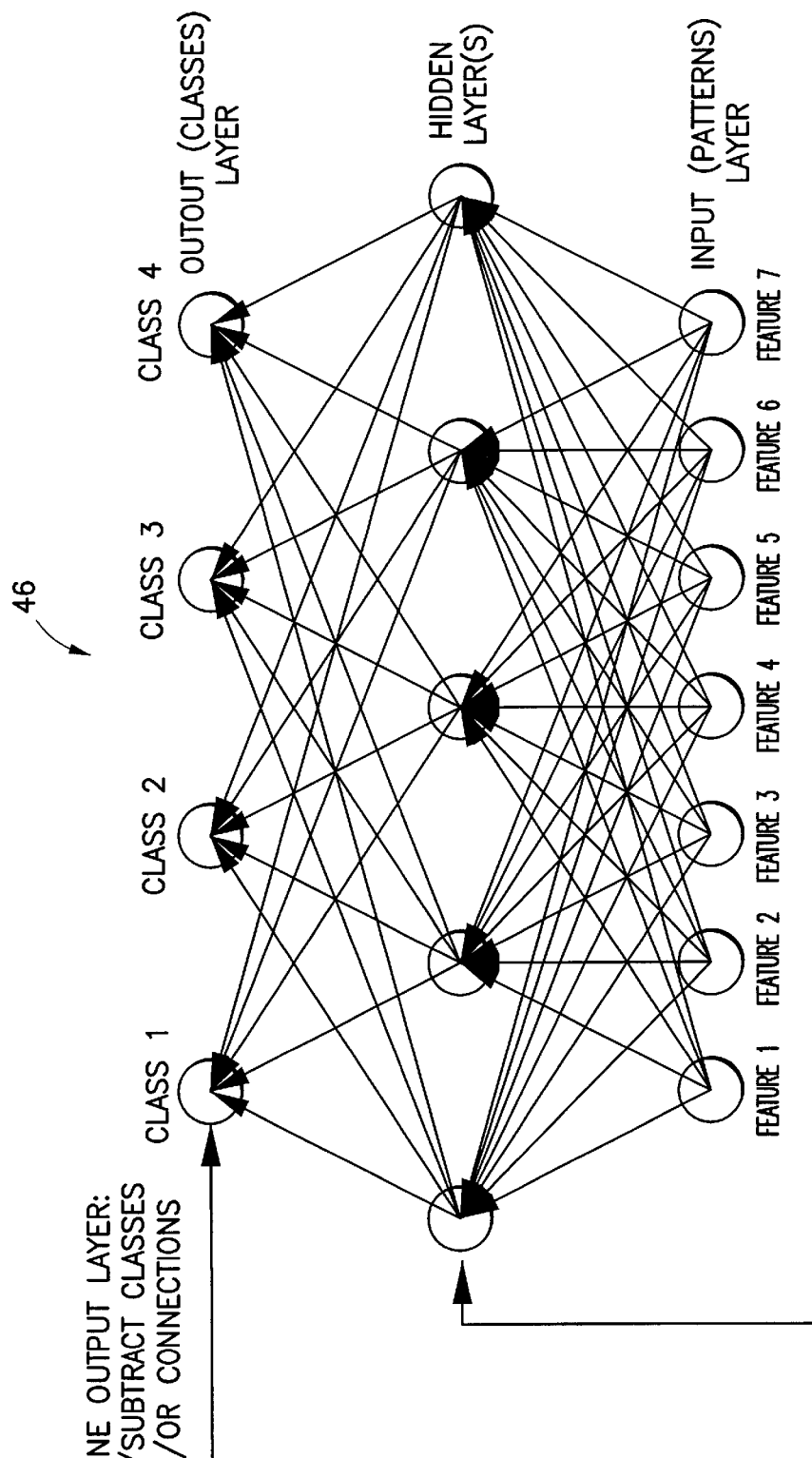
FIG. 4 shows further illustrative refinements of the FIG. 3 neural network.

FIG. 3, in turn, shows a neural-net (44) that may be used in realization of the FIGS. 1 and 2 data mining correlation algorithm. Note the reference to classes which represent classification of input features. The FIG. 3 neural-net (44) in turn, may be advantageously refined, as shown in the FIG. 4 neural-net (46), to capture the self-reflexive capabilities of the present invention, as elaborated above.

It is well understood that the computer system and method of the present invention can be implemented using a plurality of separate dedicated or prigrammable integrated or other electronic circuits or devices (e.g., hardwired or logic circuits such as discrete element circuits, or programmable logic devices such as PLDs, PLAs, PALs, or the like). A suitably programmed general purpose computer, e.g., a microprocessor, microcontroller or other processor devices (CPU or MPU), either alone or in conjuction with one or more peripheral (e.g., integrated circuit) data and signal processing devices can be used to implement the invention. In general, any device or assembly of devices on which a finite state machine capable of implementing the flow charts shown in the figures can be used as a controller with the invention.

What is claimed:

1. A computer method comprising:
   providing a shelf-space-requirements database comprising a compendium of individual shelf-space-requirements history;
   providing a shelf-space-availability database comprising a compendium of at least one of shelf-space management solutions, shelf-space information, and shelf-space diagnostics;
   employing a data mining technique for interrogating said shelf-space-requirements and shelf-space-availability databases for generating an output data stream, said output data stream correlating shelf-space-requirements with shelf-space-availability solutions; and
   refining said data mining technique based on said output data stream.

2. A method according to claim 1, further comprising:
updating the shelf-space-requirements database.

3. A method according to claim 2, wherein said updating said shelf-space requirements database comprises updating the shelf-space-requirements database so that it includes the results of employing a data mining technique.

4. A method according to claim 2, wherein said refining said data mining technique comprises:
refining an employed data mining technique in cognizance of pattern changes embedded in each database as a consequence of updating the shelf-space-requirements database.

5. A method according to claim 1, further comprising:
updating the shelf-space-availability database.

6. A method according to claim 5, wherein said updating said shelf-space availability database comprises updating the shelf-space-availability database so that it includes the effects of employing a data mining technique on the shelf-space-requirements database.

7. A method according to claim 5, wherein said refining said data mining technique comprises:
refining an employed data mining technique in cognizance of pattern changes embedded in each database as a consequence of updating the shelf-space-availability database.

8. A method according to claim 1, wherein said data mining technique comprises a neural-network data mining technique.

9. The method according to claim 8, wherein said neural network data mining technique comprises a neural network based classification of said shelf-space requirement features.

10. The method according to claim 1, wherein said shelf-space-requirements comprise shelf-space requirement features for a particular item.

11. The method according to claim 10, wherein said shelf-space requirement features comprise at least one of style, size, color, current local inventory and expected shelf-space-requirements by week for said particular item.

12. The method according to claim 10, wherein a correlation between said shelf-space-requirements and said shelf-space-availability solutions indicates a recommended solution.

13. The method according to claim 12, wherein said output data stream comprises a list of recommended solutions.

14. A program storage device readable by machine, tangibly embodying a program of instructions executable by the machine to perform a method for providing an interactive shelf-space management database the method comprising:

providing a shelf-space-requirements database comprising a compendium of individual shelf-space-requirements history;

providing a shelf-space-availability database comprising a compendium of at least one of shelf-space management solutions, shelf-space information, and shelf-space diagnostics;

employing a data mining technique for interrogating said shelf-space-requirements and shelf-space-availability databases for generating an output data stream, said output data stream correlating shelf-space-requirements with shelf-space-availability solutions; and refining said data mining technique based on said output data stream.

15. A computer comprising:

an input device for inputting a shelf-space-requirements database comprising a compendium of individual shelf-space-requirements history, and inputting a shelf-space-availability database comprising a compendium of at least one of shelf-space management solutions, shelf-space information, and shelf-space diagnostics;

a processor for employing a data mining technique for interrogating said shelf-space-requirements and shelf-space-availability databases; and an output device for generating an output data stream, said output data stream correlating shelf-space-requirements with shelf-space-availability solutions, wherein said data mining technique is refined based on said output data stream.

* * * * *